US007920392B2

(12) United States Patent
Schneider et al.

(10) Patent No.: US 7,920,392 B2
(45) Date of Patent: Apr. 5, 2011

(54) DYNAMIC VOLTAGE SAG CORRECTION

(75) Inventors: Robert S. Schneider, Middleton, WI (US); William E. Brumsickle, Madison, WI (US)

(73) Assignee: Soft Switching Technologies Corporation, Middleton, WI (US)

( * ) Notice: Subject to any disclaimer, the term of this patent is extended or adjusted under 35 U.S.C. 154(b) by 660 days.

(21) Appl. No.: 11/835,000

(22) Filed: Aug. 7, 2007

(65) Prior Publication Data
US 2008/0278976 A1 Nov. 13, 2008

Related U.S. Application Data

(60) Provisional application No. 60/917,441, filed on May 11, 2007, provisional application No. 60/938,054, filed on May 15, 2007.

(51) Int. Cl.
*H02M 5/45* (2006.01)
*H02M 5/458* (2006.01)
(52) U.S. Cl. ............................ 363/37; 323/208; 307/105
(58) Field of Classification Search .................. 363/34, 363/37, 56.05; 323/207, 208; 307/105, 130; 361/58
See application file for complete search history.

(56) References Cited

U.S. PATENT DOCUMENTS

| | | | |
|---|---|---|---|
| 5,814,975 A * | 9/1998 | Nelson et al. | 323/207 |
| 6,118,676 A | 9/2000 | Divan et al. | |
| 6,462,518 B1 * | 10/2002 | Fischer et al. | 323/207 |
| 2003/0090257 A1 * | 5/2003 | Howes | 324/127 |
| 2005/0264269 A1 * | 12/2005 | Fattohi | 323/255 |

OTHER PUBLICATIONS

Brumsickle, W.E. et al., "Dynamic sag correctors: cost-effective industrial power line conditioning", IEEE Transactions on Industry Applications, vol. 37, Issue 1, pp. 212-217, Jan.-Feb. 2001.
Po-Tai Cheng et al., "A transformer inrush mitigation method for series voltage sag compensators", IAS 2005, vol. 2, pp. 881-888, Oct. 2005.
Visser, A.J. et al., "Direct-coupled cascaded multilevel sag compensator", PESC 2000, vol. 1, pp. 463-469, Jun. 18-23, 2000.
International Search Report and Written Opinion for International Application No. PCT/US2008/063067 dated Oct. 28, 2008.

* cited by examiner

*Primary Examiner* — Harry Behm
*Assistant Examiner* — Matthew Grubb
(74) *Attorney, Agent, or Firm* — Foley & Lardner LLP

(57) ABSTRACT

A voltage sag correction device includes an input terminal adapted to receive a first operating signal having a line-to-neutral voltage. The first operating signal is provided to a load through an output terminal. A regulator module includes a rectifying device adapted to rectify a line-to-line input signal, a storage unit adapted to store energy corresponding to the rectified line-to-line input signal, and an inverter switching device adapted to use the stored energy to generate a correction signal during at least a portion of a voltage sag. An injection transformer in electrical communication with the regulator module is adapted to reduce a voltage of the correction signal. A bypass switch is in a closed position during a normal operating condition such that the injection transformer is bypassed. The bypass switch is in an open position during at least a portion of the voltage sag such that the injection transformer is energized.

50 Claims, 4 Drawing Sheets

DYNAMIC VOLTAGE SAG CORRECTION

CROSS-REFERENCE TO RELATED APPLICATIONS

This application claims priority from U.S. Provisional Application No. 60/917,441, filed May 11, 2007, and U.S. Provisional Application No. 60/938,054, filed May 15, 2007, both of which are incorporated herein by reference in their entirety.

FIELD

The subject of the disclosure relates generally to dynamic voltage sag correction More specifically, the disclosure relates a device and method for optimal utilization of the kVA capability of a dynamic voltage sag correction device which can be adapted for use with a plurality of input voltages.

BACKGROUND

An electrical load which receives power through an AC power system is generally designed to operate reliably when the actual supply input voltage is within approximately 10% of the rated supply input voltage. A voltage sag (or dip) can refer to a temporary reduction of the rms AC voltage in which the actual supply input voltage is below approximately 90% of the rated supply input voltage. A dynamic voltage sag correction device can refer to a device which is capable of correcting temporary voltage sags in a voltage input signal that is being provided to a load. Voltage sags can be caused by startup of a large load within a facility, a circuit fault a problem at a utility company, a problem with a generator, or any of a number of other reasons. The dynamic voltage sag correction device is generally inserted between the voltage input and the load, and includes a combination of circuit elements and logic which are adapted to provide a correction signal almost instantaneously.

Traditional dynamic voltage sag correction devices are packaged according to their current and voltage ratings. For example, a first dynamic voltage sag correction device for a three-phase input voltage may be rated for 100 amps (A) at 277 volts (V), and have a corresponding kilovolt ampere (kVA) rating of $((277\ V)*(100\ A)*(\sqrt{3}))/1000=48.0$ kVA. A second dynamic voltage sag correction device for a three-phase input voltage may be rated for 100 A at 120 V such that its kVA rating is 20.8 kVA. Because components in a dynamic voltage sag correction device are selected primarily according to the current rating, the first and second dynamic voltage sag correction devices are similar in physical size, components used, and cost. In other words, the second dynamic voltage sag correction device with a kVA rating of 20.8 kVA costs almost as much as the first dynamic voltage sag correction device with a kVA rating of 48.0 kVA Traditional manufacturers generally make a distinct dynamic voltage sag device for each distinct input voltage.

Manufacturing a distinct dynamic voltage sag correction device for each distinct input voltage also increases the cost of manufacturing. For example, a first dynamic voltage sag correction device with a 208 V rating may be manufactured for use only with a 208 V input, a second dynamic voltage sag correction device with a 240 V rating may be manufactured for use only with a 240 V input, and so on. Each of these differently rated dynamic voltage sag correction devices require different parts and are manufactured and packaged separately. As a result, dynamic voltage sag correction device manufacturers are required to purchase and inventory parts for a plurality of different devices. Manufacturing costs would be reduced if a single dynamic voltage sag correction device could be adapted for use with a plurality of input voltages.

In some instances, dynamic voltage sag correction devices are used at a fraction of their ratings. For example, a dynamic voltage sag correction device with a three-phase voltage rating of 480 V (in a 277 V line-to-neutral system) may be used in a system which is supplied by an input voltage of 208 V (in a 120 V line-to-neutral system). As a result, the kVA throughput of the dynamic voltage sag correction device is reduced below its rating. Traditional dynamic voltage sag correction devices are further limited in their ability to accept higher input voltages such as a 600 V line-to-line signal. To handle these high voltages, specialized heavy duty devices are manufactured. The specialized devices are manufactured and packaged separately from lower voltage dynamic voltage sag correction devices, resulting in additional costs and the need to inventory additional parts.

Thus, there is a need for a dynamic voltage sag correction device in which optimal utilization of the kVA capability of the device can be achieved regardless of the input voltage. Further, there is a need for a dynamic voltage sag correction device which can be configured for use with a plurality of distinct input voltages. Further, there is a need for a high voltage dynamic voltage sag correction device which is able to provide a correction signal in an even higher voltage system.

SUMMARY

An exemplary dynamic voltage sag correction device includes an input terminal adapted to receive a first operating signal, where the first operating signal has a line-to-neutral voltage. The first operating signal is provided to a load through an output terminal which is in electrical communication with the input terminal. The dynamic voltage sag correction device also includes a regulator module including a rectifying device, a storage unit, and an inverter switching device. The rectifying device is adapted to rectify a line-to-line input signal, where the line-to-line input signal is obtained from a second operating signal having the line-to-neutral voltage and a third operating signal having the line-to-neutral voltage. The storage unit is adapted to store energy corresponding to the rectified line-to-line input signal, and the inverter switching device is adapted to use the stored energy to generate a correction signal during a voltage sag. An injection transformer in electrical communication with the regulator module is adapted to reduce a voltage of the correction signal. A bypass switch is in electrical communication with the input terminal and the output terminal. The bypass switch is in a closed position during a normal operating condition such that the injection transformer is bypassed, and in an open position during at least a portion of the voltage sag such that the injection transformer is energized.

An exemplary method of correcting a voltage sag condition includes connecting a load to an output terminal such that the load receives a line-to-neutral voltage of a first operating signal through the output terminal. A line-to-line input signal is rectified, where the line-to-line input signal is obtained from a second operating signal having the line-to-neutral voltage and a third operating signal having the line-to-neutral voltage. Energy corresponding to the rectified line-to-line input signal is stored in a storage unit. A voltage sag is detected, and an inverter switching device is used to generate a correction signal with the stored energy in response to the detected voltage sag. A static bypass switch is opened such that an injection transformer is not bypassed. The injection transformer is used to reduce a voltage of the correction signal such that the correction signal can be provided to the load.

Another exemplary dynamic voltage sag correction device includes an input terminal and an output terminal in electrical communication with the input terminal. The output terminal is capable of providing a first operating signal to a load, where the first operating signal has a line-to-neutral voltage. An input boost transformer is adapted to increase a line-to-line voltage obtained across a second operating signal having the line-to-neutral voltage and a third operating signal having the line-to-neutral voltage such that an increased line-to-line input signal is provided to a regulator module. The regulator module is connected between the input terminal and the output terminal and includes a rectifying device, a storage unit, and an inverter switching device. The rectifying device is adapted to rectify the increased line-to-line input signal, and the storage unit is adapted to store energy corresponding to the rectified increased line-to-line input signal. The inverter switching device is adapted to use the stored energy to generate a correction signal during a voltage sag. An injection transformer is in electrical communication with the regulator module and is adapted to reduce a voltage of the correction signal. A secondary winding of the injection transformer is connected in series between the input terminal and the output terminal. A bypass switch is in electrical communication with the input terminal and the output terminal. The bypass switch is in a closed position during a normal operating condition such that the injection transformer is bypassed, and in an open position during at least a portion of the voltage sag such that the injection transformer is energized.

Another exemplary method of correcting a voltage sag condition includes connecting a load to an output terminal such that the load receives a line-to-neutral voltage of a first operating signal. An input boost transformer is used to increase a line-to-line voltage obtained across a second operating signal having the line-to-neutral voltage and a third operating signal having the line-to-neutral voltage such that an increased line-to-line input signal is provided to a regulator module. The increased line-to-line voltage is approximately equal to a voltage rating of a regulator module. The increased line-to-line input signal is rectified, and energy corresponding to the rectified increased line-to-line input signal is stored in a storage unit. A voltage sag along a first AC bus line in electrical communication with the output terminal is detected, and an inverter switching device is used to generate a correction signal with the stored energy. A static bypass switch is opened such that an injection transformer is not bypassed. The injection transformer is used to reduce a voltage of the correction signal, and the correction signal is provided from the injection transformer to the load.

Another exemplary dynamic voltage sag correction device includes an input terminal and an output terminal in electrical communication with the input terminal. The output terminal is adapted to provide a first operating signal to a load, where the first operating signal has a line-to-neutral voltage. A step-down transformer is adapted to decrease a line-to-line voltage obtained across a second operating signal having the line-to-neutral voltage and a third operating signal having the line-to-neutral voltage such that a decreased line-to-line input signal is provided to a regulator module. The regulator module is connected between the input terminal and the output terminal and includes a rectifying device adapted to rectify the decreased line-to-line input signal, a storage unit adapted to store energy corresponding to the rectified decreased line-to-line voltage, and an inverter switching device adapted to use the stored energy to generate a correction signal during a voltage sag. An output boost transformer is in electrical communication with the regulator module and is adapted to increase a voltage of the correction signal.

Another exemplary method of correcting a voltage sag condition includes connecting a load to an output terminal adapted to provide the load with a first operating signal which has a line-to-neutral voltage. A step-down transformer is used to decrease a line-to-line voltage obtained across a second operating signal having the line-to-neutral voltage and a third operating signal having the line-to-neutral voltage such that a decreased line-to-line input signal is provided to a regulator module. The decreased line-to-line input signal is rectified, and energy corresponding to the rectified decreased line-to-line input signal is stored in a storage unit. A voltage sag is detected and an inverter switching device is used to generate a correction signal with the stored energy in response to the detected voltage sag. A static bypass switch is opened such that an output boost transformer is energized. The output boost transformer is used to increase a voltage of the correction signal.

Another exemplary dynamic voltage sag correction device includes an input terminal and an output terminal in electrical communication with the input terminal. The output terminal is adapted to provide a first operating signal to a load, where the first operating signal has a line-to-neutral voltage. A step-down transformer is adapted to increase a line-to-line voltage obtained across a second operating signal having the line-to-neutral voltage and a third operating signal having the line-to-neutral voltage such that an increased line-to-line input signal is provided to a regulator module. The regulator module, which is connected between the input terminal and the output terminal, includes a rectifying device adapted to rectify the increased line-to-line input signal, a storage unit adapted to store energy corresponding to the rectified increased line-to-line voltage, and an inverter switching device adapted to use the stored energy to generate a correction signal during at least a portion of a voltage sag. An output buck transformer in electrical communication with the regulator module is adapted to decrease a voltage of the correction signal. A bypass switch is in electrical communication with the input terminal and the output terminal. The bypass switch is in a closed position during a normal operating condition such that the step-down transformer and the output buck transformer are bypassed.

Other principal features and advantages will become apparent to those skilled in the art upon review of the following drawings, the detailed description, and the appended claims.

BRIEF DESCRIPTION OF THE DRAWINGS

Exemplary embodiments will hereafter be described with reference to the accompanying drawings.

DETAILED DESCRIPTION

The kilovolt ampere (kVA) rating of a power electronic switching device is a measure of the maximum capacity of the power electronic device. In general it is desirable to utilize the full kVA capacity of a device to minimize costs, optimize device performance, and optimize efficiency of the device. The kVA rating can be calculated for a single phase device using Equation 1 below in which V is the maximum rms blocking voltage across the device and A is the maximum rms current through the device. For a three-phase device, the kVA can be calculated using Equation 2 below. It can be seen from Equations 1 and 2 that the kVA rating and/or the kVA capability of a device is directly proportional to the voltage across the device. This principle can be used along with specially configured transformers to maximize the kVA rating and/or kVA capability of dynamic voltage sag correction devices.

$$\text{kVA (single phase)} = (V) * (A) * \frac{1 \text{ kilo Volts}}{1000 \text{ Volts}} \quad \text{Equation 1}$$

$$\text{kVA (three-phase)} = (V) * (A) * \frac{1 \text{ kilo Volt}}{1000 \text{ Volts}} * (\sqrt{3}) \quad \text{Equation 2}$$

Figure 1:
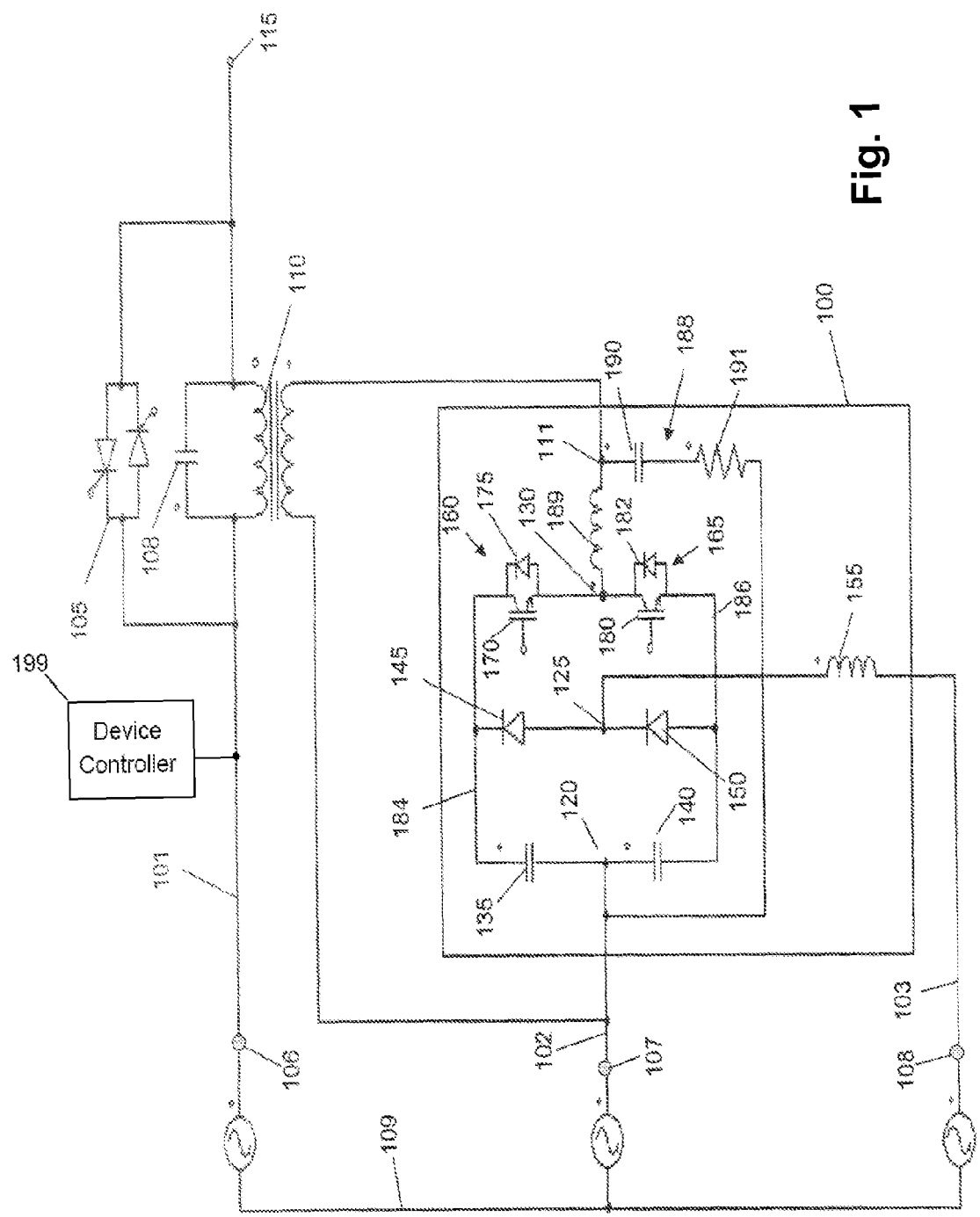
FIG. 1 is a circuit diagram illustrating one phase of a dynamic voltage sag correction device with a series injection transformer in accordance with an exemplary embodiment.

FIG. 1 is a circuit diagram illustrating one phase of a dynamic voltage sag correction device with a series injection transformer 110 in accordance with an exemplary embodiment. The dynamic voltage sag correction device includes a regulator module 100, a static bypass switch 105, series injection transformer 110, an output terminal 115, and a three-phase input. The three-phase input, which can be provided by a utility company, a generator, etc., can be received at an input terminal 106, an input terminal 107, and an input terminal 108. The three-phase input also includes a neutral line 109 such that the three-phase input includes four input lines. Alternatively, neutral line 109 may not be included and the three-phase input can include three lines. The devices described herein can be used to provide voltage sag correction regardless of whether a physical neutral line is included in the input. Further, as used herein, line-to-neutral voltage can refer to the voltage on a single line of an input regardless of whether the input includes a physical neutral line. An AC bus line 101 is connected to input terminal 106 to receive a first operating signal of the three-phase input, an AC bus line 102 is connected to input terminal 107 to receive a second operating signal of the three-phase input, and an AC bus line 103 is connected to input terminal 108 to receive a third operating signal of the three-phase input such that power can be provided to the system. In an exemplary embodiment, the first operating signal (along AC bus line 101) can have a first phase, the second operating signal (along AC bus line 102) can have a second phase which is shifted 120 degrees from the first phase, the third operating signal (along AC bus line 103) can have a third phase which is shifted 240 degrees from the first phase.

Static bypass switch 105 can be implemented as power transistor switching devices, a pair of thyristors connected in anti-parallel, or any other type of switching components known to those of skill in the art. During normal operation, i.e., when there is no voltage sag, static bypass switch 105 can be closed such that an operating signal flows directly from AC bus line 101 to output terminal 115. When a voltage sag is detected, static bypass switch 105 can be opened by any method known to those of skill in the art, and the operating signal from AC bus line 101 can be supplemented with or replaced by a correction signal which is generated by regulator module 100 and provided through series injection transformer 110. As such, series injection transformer 110 can be a low-duty transformer which is bypassed and remains essentially non-energized during normal operation. Series injection transformer 110 may only be energized during a sag condition. As a result, there are no continuous power losses associated with series injection transformer 110.

Series injection transformer 110 can include a primary winding connected across regulator module 100 and a secondary winding connected in series with AC bus line 101. A turns ratio of a transformer can refer to the ratio of turns in the primary winding to turns in the secondary winding. The turns ratio can be adjusted (by switching taps or switching transformers) to control a voltage at the secondary winding. In an exemplary embodiment, series injection transformer 110 can be used to step down (or reduce) the correction signal such that a load connected at output terminal 115 is provided with the proper voltage during a voltage sag. For example, series injection transformer 110 can be a step-down transformer capable of reducing a voltage of 208 V produced by regulator module 100 into a voltage of 120 V or less for use by the load.

Regulator module 100 is used to generate and provide the correction signal to series injection transformer 110. In an exemplary embodiment, regulator module 100 can include a half-bridge inverter. Regulator module 100 is connected to the three-phase input through a line-to-line connection with AC bus line 102 and AC bus line 103. Using a direct line-to-line connection without a step-down transformer (or as opposed to a line-to-neutral connection) results in an increased input voltage to regulator module 100. For example, the three-phase input may be a 120 V input used to provide a 120 V operating signal to the load connected at output 115. With a line-to-neutral connection (or a transformer which steps the voltage down to line-to-neutral), regulator module 100 is only provided with an input voltage of 120 V. With the line-to-line connection illustrated in FIG. 1, regulator module 100 is provided with an input voltage of (120 V)*(√3)=208 V. As such, regulator module 100 can be rated for at least 208 V, and the kVA of the dynamic voltage sag correction device is increased.

Regulator module 100 includes a storage node 120, a rectifying node 125, and an inverting node 130. Storage node 120 receives an input from AC bus line 102, and is a connecting point between a first storage unit 135 and a second storage unit 140 which is in series with first storage unit 135. In an exemplary embodiment, first storage unit 135 and second storage unit 140 can be any type of capacitor(s) known to those of skill in the art. First storage unit 135 and second storage unit 140 can accumulate and store energy in the form of electrical charges during normal operation of the system. These stored charges can be released during a voltage sag to supplement or replace a voltage provided to output terminal 115 through AC bus line 101. In an alternative embodiment, first storage unit 135 and/or second storage unit 140 can be any other type of energy storage device known to those of skill in the art.

Rectifying node 125 receives an input from AC bus line 103, and is a connecting point between a first rectifying device 145 and a second rectifying device 150 which is in series with first rectifying device 145. First rectifying device 145 and second rectifying device 150, which form a rectifying bridge, conduct current in the same direction (i.e., first rectifying device 145 conducts current in a direction away from rectifying node 125 and second rectifying device 150 conducts current in a direction toward rectifying node 125). As such, first rectifying device 145 can be used to charge first storage unit 135 and second rectifying device 150 can be used to charge second storage unit 140 as known to those skilled in the art. As a result, regulator module 100 can be used to provide a correction signal which is approximately double the received input voltage such that voltage sags down to 50% of nominal voltage can be fully corrected. A charging inductor 155 can be used to limit current surges into the rectifier bridge and protect the circuit elements upon a sudden increase in line-to-line voltage. The sudden increase in line-to-line voltage may occur at startup and/or when a voltage sag condition ends. In one embodiment, a soft charging circuit as known to those skilled in the art can be used during startup to prevent undesirable current surges. In an exemplary embodiment, first rectifying device 145 and/or second rectifying device 150 can be semiconductor diodes. Alternatively, the rectifying devices can be any other devices capable of rectifying the AC line-to-line input signals from AC bus line 102 and AC bus line 103.

Inverting node 130 is in electrical communication with series injection transformer 110, and is a connecting point between a first inverter switching device 160 and a second inverter switching device 165 which is in series with first inverter switching device 160. First switching device 160 includes a first transistor 170 and a first diode 175 connected in anti-parallel with first transistor 170. Second switching device 165 includes a second transistor 180 and a second diode 182 connected in anti-parallel with second transistor 180. In an exemplary embodiment, first transistor 170 and/or second transistor 180 can be insulated gate bipolar transistors (IGBTs). Alternatively, any other type(s) of transistors can be used. During a voltage sag, a device controller can be used to control first inverter switching device 160 and second inverter switching device 165 such that an adequate correction signal is generated from the charges stored in first storage unit 135 and second storage unit 140. In an alternative embodiment, first inverter switching device 160 and/or second inverter switching device 165 can be implemented using any other components and/or by any other method known to those of skill in the art.

First storage unit 135 and second storage unit 140, first rectifying device 145 and second rectifying device 150, and first inverter switching device 160 and second inverter switching device 165 are connected in parallel through a first bus line 184 and a second bus line 186. A low pass filter 188 is connected at inverting node 130 between first inverter switching device 160 and second inverter switching device 165. Low pass filter 188 includes a filter inductor 189, a filter capacitor 190, and a filter resistor 191. In an exemplary embodiment, low pass filter 188 can be used to filter high frequency switching components from the AC correction signal which is provided by regulator module 100 to series injection transformer 110. As such, series injection transformer 110 is in electrical communication with the inverter switching devices through low pass filter 188. As used herein, electrical communication can refer to any direct or indirect electrical connection.

In an exemplary embodiment, the dynamic voltage sag correction device can also include the device controller 199. The device controller can be implemented as one or more programmable integrated circuits, discreet analog circuit components, discreet digital circuit components, or any combination thereof. The device controller can be used to control charging of the storage units, detect a voltage sag, and control opening and closing of static bypass switch 105. The device controller can also be used to control the inverter switching devices to generate an appropriate correction signal to supplement or replace the input operating signal such that a load at output terminal 115 can continue receiving adequate power without interruption. The correction signal generated by the inverter switching devices can have a voltage which, after being stepped down by series injection transformer 110, is adequate to supplement or replace the operating signal (if any) provided through input bus line 101 such that the load receives approximately the same line-to-neutral voltage as is provided during a normal operating condition.

As an example, during normal operation, static bypass switch 105 can be closed such that an operating signal with a line-to-neutral voltage can be provided from AC bus line 101 directly to a load connected to output terminal 115. At any time during normal operation, first storage unit 135 and second storage unit 140 can be fully charged through AC bus line 102 and AC bus line 103. The device controller can continually monitor the operating signal for a voltage sag. The operating signal can be monitored at input terminal 106, at output terminal 115, at any location along AC bus line 101, and/or at any other location. In one embodiment, the device controller can identify a voltage sag when the operating signal is less than a predetermined percentage of the normal operating signal value. For example, a voltage sag may be identified when the operating signal at output terminal 115 drops below 90% of the normal operating signal value. Alternatively, the predetermined percentage can be any other value. The device controller can detect the voltage sag using one or more comparators, logic gates, analog devices, or any other method(s) known to those of skill in the art. In an exemplary embodiment, the device controller can be the controller described in detail with reference to U.S. Pat. No. 6,118,676, the entire disclosure of which is incorporated herein by reference.

When a voltage sag is detected, the device controller can use additional logic to determine the value of a correction signal such that a combination of the operating signal provided through AC bus line 101 and the correction signal (after passing through series injection transformer 110) results in a signal which is equal to or close to the normal operating signal value. The device controller can control first inverter switching device 160 and second inverter switching device 165 such that an adequate AC correction signal is generated by alternating discharges from first storage unit 135 and second storage unit 140. In an exemplary embodiment, first storage unit 135 and second storage unit 140 can also continue to receive charges (if available) from AC bus line 102 and AC bus line 103 during the voltage sag The correction signal, which can be in phase with the operating signal from AC bus line 101, can pass through low pass filter 188 to remove any high frequency switching components introduced into the correction signal by first inverter switching device 160 and/or second inverter switching device 165.

The correction signal can pass from low pass filter 188 to series injection transformer 110. As illustrated in FIG. 1, a primary winding of series injection transformer 110 is connected across regulator module at AC bus line 102 and a regulator output 111. A secondary winding of series injection transformer 110 is connected in series with AC bus line 101 The secondary winding is also connected in parallel with a filter capacitor 108. Filter capacitor 108 can be used in combination with leakage inductance of series injection transformer 110 to form a second low pass filter stage which is in series with low pass filter 188. In an exemplary embodiment, series injection transformer 110 can step a voltage of the correction signal down to a voltage which is less than or equal to the line-to-neutral voltage used by the load connected at output terminal 115. For example, AC bus line 101 may normally provide an operating signal of 120 V to output terminal 115. A voltage sag can occur such that AC bus line 101 is only able to provide 80 V to output terminal 115. The device controller can cause the inverter switching devices to generate the correction signal which, after being reduced by injection capacitor 110, is equal to approximately 40 V. Because the secondary winding of injection capacitor 110 is in series with AC bus line 101, the 80 V from AC bus line 101 and the 40 V correction signal are additive, resulting in a 120 V operating signal provided to output terminal 115.

As a result, regulator module 100 can be rated at a higher voltage (i.e., the line-to-line voltage) than the line-to-neutral voltage of the system, and the kVA of the dynamic voltage sag correction device is advantageously increased. For example, a normal line-to-neutral voltage of AC bus line 101, AC bus line 102, and AC bus line 103 can be 120 V, and the line-to-line voltage across AC bus line 102 and AC bus line 103 can be $(120 \text{ V})*(\sqrt{3})=208$ V. As such, first storage unit 135 and second storage unit 140 can each be charged (to a DC voltage which is a peak voltage of the RMS voltage of 208 V) such that an AC voltage produced by inverter module 100 is approximately 208 V. A current value through AC bus line 101, AC bus line 102, and AC bus line 103 can be 100 A such that regulator module 100 can have a kVA of approximately $((208 \text{ V})*(100 \text{ A}))/1000=20.8$ kVA. Connecting regulator module 100 through a line-to-neutral voltage (120 V) or stepping the line-to-line voltage down to 120 V would result in a kVA of $((120 \text{ V})*(100 \text{ A}))/1000=12$ kVA. Thus, using the line-to-line voltage along with series injection transformer 110 results in a 73.3% increase in kVA. Further, because the cost of the dynamic voltage sag correction device is primarily current driven, the cost of the '208 V' dynamic voltage sag correction device with 100 A capability is only incrementally more than the cost of the '120 V' dynamic voltage sag correction device with 100 A capability. Further yet, the use of series injection transformer 110 at the output of regulator module 100 allows regulator module 100 to be used in both 120 V and 208 V (i.e., without series injection transformer 110) line-to-neutral configurations. As a result, manufacturing costs are reduced because less distinct regulator modules are needed and components can be bought in greater bulk.

It is to be understood that regulator module 100 illustrated in and described with reference to FIG. 1 is not meant to be limiting with respect to the type, number, and/or arrangement of electrical components. In alternative embodiments, regulator module 100 can include any other number of components, any other types of components, and/or any other arrangement of electrical components as known to those of skill in the art. In one embodiment, regulator module 100 can be any of the regulator and storage modules described in U.S. Pat. No. 6,118,676, the entire disclosure of which is incorporated herein by reference. Similarly, any of the other components illustrated in and/or described with reference to FIG. 1 such as static bypass switch 105, device controller, etc. can be implemented as described in U.S. Pat. No. 6,118,676, or by any other method known to those of skill in the art.

Figure 2:
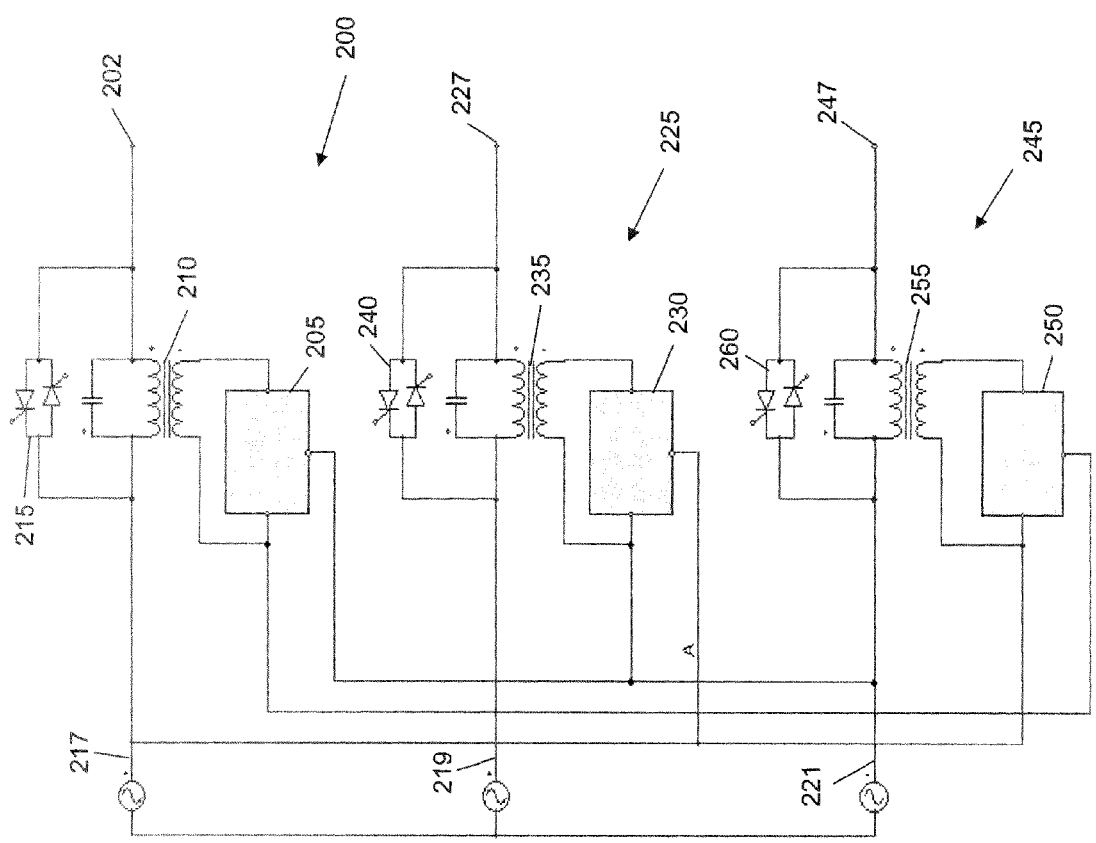
FIG. 2 is a diagram illustrating a three-phase system of dynamic voltage sag correction devices in accordance with an exemplary embodiment.

FIG. 2 is a diagram illustrating a three-phase system of dynamic voltage sag correction devices in accordance with an exemplary embodiment. In alternative embodiments, the dynamic voltage sag correction devices described herein can be used in systems with any other number of phases. A first dynamic voltage sag correction device 200 of the three-phase system can be used to provide a correction signal such that a voltage at a first output terminal 202 is maintained during a voltage sag. First dynamic voltage sag correction device 200 includes a first regulator module 205, a first series injection transformer 210, and a first static bypass switch 215. A three-phase input to the system is provided through an AC bus line 217, an AC bus line 219, and an AC bus line 221. First regulator module 205 is connected to a line-to-line voltage across AC bus line 219 and AC bus line 221. In an exemplary embodiment, first regulator module 205 can include the same components as regulator module 100 described with reference to FIG. 1. Alternatively, first regulator module 205 may include any other components which can be used to generate a correction signal. In another exemplary embodiment, first static bypass switch 215, first series injection transformer 210, and first regulator module 205 can operate the same as static bypass switch 105, series injection transformer 110, and regulator module 100 described with reference to FIG. 1.

A second dynamic voltage sag correction device 225 of the three-phase system can be used to provide a correction signal such that a voltage at a second output terminal 227 is maintained during a voltage sag. Second dynamic voltage sag correction device 225 includes a second regulator module 230, a second series injection transformer 235, and a second static bypass switch 240. Second regulator module 230 is connected to a line-to-line voltage across AC bus line 217 and AC bus line 221. In an exemplary embodiment, second regulator module 230 can include the same components as regulator module 100 described with reference to FIG. 1. Alternatively, second regulator module 230 may include any other components which can be used to generate the correction signal. In another exemplary embodiment, second static bypass switch 240, second series injection transformer 235, and second regulator module 230 can operate the same as static bypass switch 105, series injection transformer 110, and regulator module 100 described with reference to FIG. 1.

A third dynamic voltage sag correction device 245 of the three-phase system can be used to provide a correction signal such that a voltage at a third output terminal 247 is maintained during a voltage sag. Third voltage sag correction device 245 includes a third regulator module 250, a third series injection transformer 255, and a third static bypass switch 260. Third regulator module 250 is connected to a line-to-line voltage across AC bus line 217 and AC bus line 219. In an exemplary embodiment, third regulator module 250 can include the same components as regulator module 100 described with reference to FIG. 1. Alternatively, third regulator module 250 may include any other components which can be used to generate the correction signal. In another exemplary embodiment, third static bypass switch 260, third series injection transformer 255, and third regulator module 250 can operate the same as static bypass switch 105, series injection transformer 110, and regulator module 100 described with reference to FIG. 1.

The three-phase system described with reference to FIG. 2 allows the kVA to be increased in each of the three dynamic voltage sag correction devices. Thus, for a 120 V, 100 A line-to-neutral signal which is connected line-to-line as illustrated in FIG. 2, the three-phase system can have a kVA of 20.8 kVA+20.8 kVA+20.8 kVA=62.4 kVA. Using a traditional line-to-neutral configuration or a configuration with step-down transformers at the inputs, the kVA would be 12 kVA+12 kVA+12 kVA=36 kVA. Thus, it can be seen that the three-phase system of FIG. 2 provides a significant increase in kVA as compared to traditional systems. In an alternative embodiment, first series injection transformer 210, second series injection transformer 235, and third series injection transformer 255 may be replaced by a single three-phase series injection transformer as known to those of skill in the art.

Figure 3:
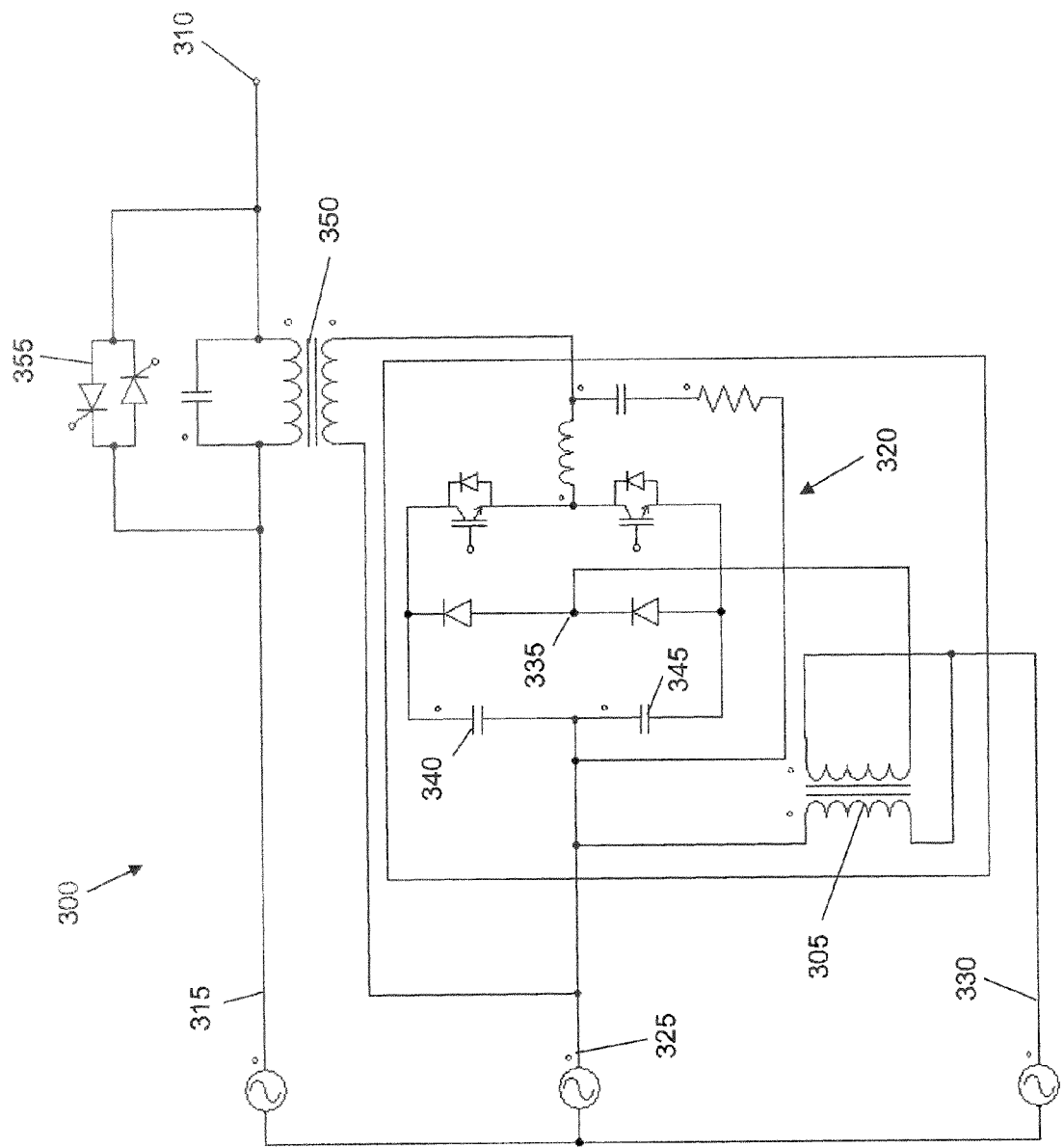
FIG. 3 is a circuit diagram illustrating a dynamic voltage sag correction device with an input boost transformer and a series injection transformer in accordance with an exemplary embodiment.

FIG. 3 is a circuit diagram illustrating a dynamic voltage sag correction device 300 with an input boost transformer 305 and a series injection transformer 350 in accordance with an exemplary embodiment. While only a single phase portion is illustrated in FIG. 3, it is to be understood that dynamic voltage sag correction device 300 can be combined with any number of other dynamic voltage sag correction devices for use in any multi-phase system. Alternatively, dynamic voltage sag correction device 300 can be incorporated into a single dynamic voltage sag correction device for use in a multi-phase system. For example, in a three-phase system, the single dynamic voltage sag correction device can include three regulator modules and a single three-phase injection transformer.

In an exemplary embodiment, dynamic voltage sag correction device 300 can be a single phase device for use in a three-phase system. With the exception of input boost transformer 305, dynamic voltage sag correction device 300 can operate in the same manner as the dynamic voltage sag correction device described with reference to FIG. 1. In another exemplary embodiment, dynamic voltage sag correction device 300 can be used to ensure that a load connected to an output terminal 310 is provided with an adequate operating voltage in the event of a voltage sag along an AC input bus 315.

Input boost transformer 305 can be used to boost a line-to-line voltage input to a regulator module 320 of dynamic voltage sag correction device 300 The line-to-line voltage input is obtained from the voltage across an AC input bus 325 and an AC input bus 330. A primary winding of input boost transformer 305 is connected across AC input bus 325 and AC input bus 330, and a secondary winding of input boost transformer 305 is connected across AC input bus 330 and a rectifying node 335 of regulator module 320. As such, an output of input boost transformer 305 goes to rectifying node 335, and a first storage capacitor 340 and a second storage capacitor 345 are charged to a voltage which is greater than the line-to-line voltage across AC input bus 325 and AC input bus 330. Series injection transformer 350, which is in series with AC bus line 315, can be used to step down the voltage of a correction signal generated by regulator module 320 as described with reference to FIGS. 1 and 2. In an exemplary embodiment, a static bypass switch 355 can be used to bypass series injection transformer 350 during normal operation such that series injection transformer 350 is a low-duty transformer through which there are no continuous power losses. During a voltage sag, static bypass switch 355 can be opened and series injection transformer 350 can be energized.

In an exemplary embodiment, regulator module 320 can be adapted for use in systems with a plurality of distinct input voltages. For example, a first input boost transformer and injection transformer combination can be used with regulator module 320 when used in a system with a first line-to-line voltage input, a second input boost transformer and injection transformer combination can be used with regulator module 320 when used in a system with a second line-to-line voltage input, and so on In an exemplary embodiment, input boost transformer 305 can be a relatively small auto transformer. Alternatively, input boost transformer 305 can be any other type of transformer capable of boosting the voltage input to regulator module 320.

As an example, a line-to-neutral voltage of AC input bus 315, AC input bus 325, and AC input bus 330 can be 120 V with a current of 100 A. As such, a line-to-line voltage across AC input bus 325 and AC input bus 330 is 208 V. Input boost transformer 305 can be a 69 V auto transformer capable of stepping the line-to-line voltage input to regulator module 320 from 208 V up to 277 V. As a result, regulator module 320, which can be rated at 277 V, can be used to provide a correction signal in a system which has a line-to-neutral voltage of 120 V. In a 100 A system which uses three dynamic voltage sag correction devices, the kVA is increased 131% from ((120 V)*(100 A)/1000)*3=36 kVA to ((277 V)*(100 A)/1000)*3=83.1 kVA. Further, using series injection transformer 350 as described with reference to FIGS. 1 and 2 alone or in combination with an input boost transformer allows a single regulator module to be adapted for use in virtually any low voltage system. In alternative embodiments, input boost transformer 305 can boost any line-to-line voltage by any other amount.

Figure 4:
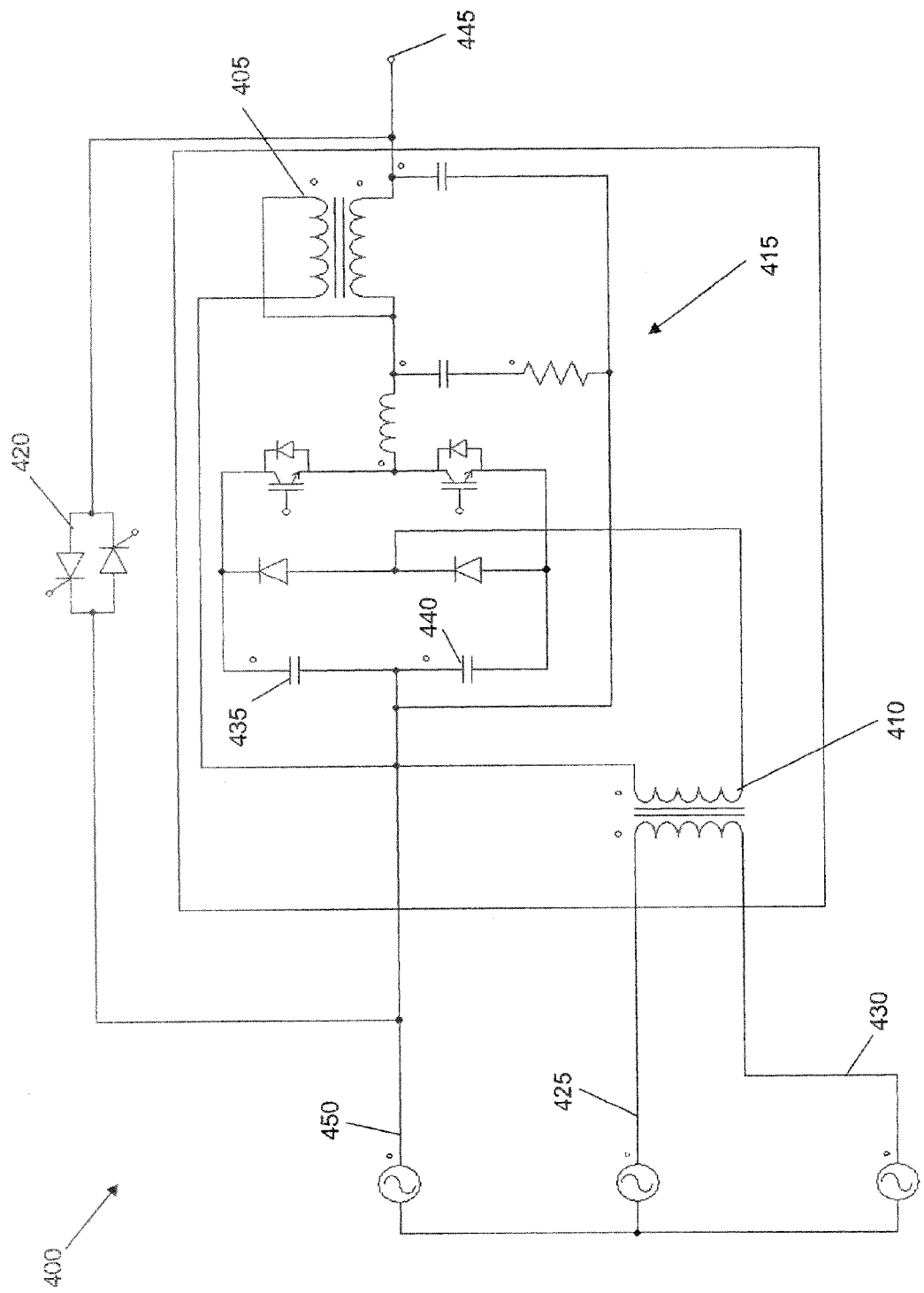
FIG. 4 is a circuit diagram illustrating a dynamic voltage sag correction device with an output boost transformer in accordance with an exemplary embodiment.

FIG. 4 is a circuit diagram illustrating a dynamic voltage sag correction device 400 with an output boost transformer 405 in accordance with an exemplary embodiment. While only a single phase portion is illustrated in FIG. 4, it is to be understood that dynamic voltage sag correction device 400 can be combined with any number of other dynamic voltage sag correction devices for use in any multi-phase system. Alternatively, dynamic voltage sag correction device 400 can be incorporated into a single dynamic voltage sag correction device for use in a multi-phase system. As an example in a three-phase system the single dynamic voltage sag correction device can include three regulator modules and use a single three-phase transformer.

Dynamic voltage sag correction device 400 includes a step-down transformer 410, a regulator module 415, a static bypass switch 420, and output boost transformer 405. Step-down transformer 410 can be used to reduce a line-to-line voltage across an AC bus line 425 and an AC bus line 430 such that an input voltage to regulator module 415 does not exceed a voltage rating of regulator module 415. As illustrated in FIG. 4, step-down transformer 410 cross couples AC bus line 425 and AC bus line 430 to the sag corrected line. The stepped down input voltage can be used to charge a first storage capacitor 435 and a second storage capacitor 440 of regulator module 415. During a voltage sag, static bypass switch 420 can be opened by a device controller, and output boost transformer 405 can be used to step a voltage of a correction signal generated by regulator module 415 up to a voltage which is adequate to supplement or replace a voltage of the operating signal (if any) which is still being provided through AC bus line 450. The correction signal and operating signal can be provided to a load connected to an output terminal 445. A primary winding of output boost transformer 405 is connected across regulator module 415, and a secondary winding of output boost transformer 405 is connected in series with regulator module 415. In an exemplary embodiment, output boost transformer 405 can be a relatively small auto transformer. Alternatively, output boost transformer 405 can be any other type of transformer known to those of skill in the art.

As an example, regulator module 415 can be rated at 277 V. A line-to-neutral voltage across an AC bus line 450 can be 346 V, and the line-to-line voltage across AC bus line 425 and AC bus line 430 can be 600 V. Step-down transformer 410 can be used to step the 600 V line-to-line voltage down to 277 V such that the rating of regulator module 415 is not exceeded. First storage capacitor 435 and second storage capacitor 440 can store energy corresponding to the stepped down voltage such that regulator module 415 can produce a correction signal of approximately 277 V. During normal operation, static bypass switch 420 can be closed, and an operating signal from AC bus line 450 can be provided directly to output terminal 445 through static bypass switch 420. Upon detection of a voltage sag, output boost transformer 405 can be used to increase the 277 V provided by regulator module 415 to a voltage of 346 V such that the operating signal along AC bus line 450 can be restored.

As described in the example above, use of step-down transformer 410 and output boost transformer 405 allows a regulator module with a voltage rating of 277 V to provide a 346

V correction signal to supplement and/or replace the line-to-neutral voltage along AC bus line 350. Thus, in addition to the ability to be adapted for use in virtually any low voltage system as described with reference to FIGS. 1-3, the '277 V' regulator module can also be adapted for use in high voltage systems. This further reduces manufacturing costs because a single regulator module can be adapted for use with in systems with a wide array of input voltages. In alternative embodiments, the regulator module adapted for use in a plurality of systems may not be rated at 277 V, but can have any other voltage rating as known to those of skill in the art.

In an alternative embodiment, the dynamic voltage sag correction device illustrated with reference to FIG. 4 can be adapted to provide sag correction in systems which operate at other voltages. As an example, regulator module 415 can have a voltage rating of 277 V and the line-to-neutral voltage across AC bus line 450 can be 240 V. As such, the line-to-line voltage across AC bus line 425 and AC bus line 430 can be 415 V. Step-down transformer 410 can be used to step the 415 V line-to-line voltage down to the regulator module voltage rating of 277 V such that the full kVA rating of regulator module 415 is utilized. Instead of auto boost transformer 415, an auto buck transformer can be used to buck the voltage at the output of regulator module 415 from 277 V down to approximately 240 V such that the operating signal on AC bus line 450 can be adequately corrected. The auto buck transformer can be connected at the output as known to those skilled in the art. In an alternative embodiment, step-down transformer 410 and the auto buck transformer can be configured for providing voltage sag correction for different operating signal values and/or for regulator modules with different kVA ratings.

The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A dynamic voltage sag correction device comprising:
   an input terminal adapted to receive a first operating signal, wherein the first operating signal has a line-to-neutral voltage;
   an output terminal in electrical communication with the input terminal and through which the first operating signal is provided to a load:
   a regulator module comprising
      a rectifying device adapted to rectify a line-to-line input signal, wherein the line-to-line input signal is obtained from a second operating signal having the line-to-neutral voltage and a third operating signal having the line-to-neutral voltage;
      a storage unit adapted to store energy corresponding to the rectified line-to-line input signal; and
      an inverter switching device adapted to use the stored energy to generate a correction signal during at least a portion of a voltage sag;
   an injection transformer in electrical communication with the regulator module and adapted to reduce a voltage of the correction signal, wherein a primary winding of the injection transformer is connected across an output of the inverter switching device and a second input terminal adapted to receive the second operating signal, wherein the second operating signal has the line-to-neutral voltage; and
   a bypass switch in electrical communication with the input terminal and the output terminal, wherein the bypass switch is in a closed position during a normal operating condition such that the injection transformer is bypassed, and further wherein the bypass switch is in an open position during at least a portion of the voltage sag such that the injection transformer is energized.

2. The device of claim 1, wherein the bypass switch comprises a static bypass switch.

3. The device of claim 1, further comprising a low pass filter connected between the inverter switching device and the injection transformer to filter high frequencies from the correction signal.

4. The device of claim 3, wherein the low pass filter comprises a filter capacitor and a filter inductor.

5. The device of claim 1, wherein the storage unit comprises a first storage capacitor connected in series with a second storage capacitor at a storage node.

6. The device of claim 5, wherein the rectifying device comprises a first rectifying device connected in series with a second rectifying device at a rectifying node.

7. The device of claim 6, wherein the first rectifying device provides the rectified line-to-line input signal to the first storage capacitor and the second rectifying device provides the rectified line-to-line input signal to the second storage capacitor.

8. The device of claim 6, wherein the first rectifying device and the second rectifying device comprise semiconductor diodes.

9. The device of claim 1, wherein the inverter switching device comprises a first inverter switching device and a second inverter switching device.

10. The device of claim 9, wherein the first inverter switching device comprises a first transistor and a first diode connected in anti-parallel, and the second inverter switching device comprises a second transistor and a second diode connected in anti-parallel.

11. The device of claim 9, further comprising a capacitor connected in parallel with a secondary winding of the injection transformer.

12. The device of claim 1, wherein the second operating signal is provided through a second AC bus line connected to a second input terminal and the third operating signal is provided through a third AC bus line connected to a third input terminal.

13. The device of claim 1, wherein the line-to-neutral voltage of the first operating signal comprises a first voltage value and a voltage rating of the regulator module comprises a second voltage value, and further wherein the first voltage value is less than the second voltage value.

14. The device of claim 13, wherein the first voltage value comprises approximately 120 Volts and the second voltage value comprises approximately 208 Volts.

15. The device of claim 1, wherein the first operating signal, the second operating signal, and the third operating signal comprise a three-phase input signal.

16. The device of claim 1, wherein the storage unit, the rectifying device, and the inverter switching device are connected in parallel by a first bus line and a second bus line.

17. The device of claim 1, wherein a sum of the voltage of the correction signal at a secondary winding of the injection transformer and a reduced line-to-neutral voltage of the first operating signal during the voltage sag are approximately equal to the line-to-neutral voltage of the first operating signal during the normal operating condition.

18. The device of claim 1, wherein a secondary winding of the injection transformer is connected in series between the input terminal and the output terminal.

19. A method of correcting a voltage sag condition comprising:
connecting a load to an output terminal such that the load receives a line-to-neutral voltage of a first operating signal through the output terminal;
rectifying a line-to-line input signal. wherein the line-to-line input signal is obtained from a second operating signal having the line-to-neutral voltage and a third operating signal having the line-to-neutral voltage;
storing energy corresponding to the rectified line-to-line input signal in a storage unit,
detecting a voltage sag;
using an inverter switching device to generate a correction signal with the stored energy in response to the detected voltage sag;
opening a static bypass switch such that an injection transformer is not bypassed; and
using the injection transformer to reduce a voltage of the correction signal such that the correction signal can be provided to the load, wherein a primary winding of the injection transformer is connected across an output of the inverter switching device and an input terminal of the second operating signal.

20. The method of claim 19, wherein a secondary winding of the injection transformer is connected in series with an AC bus line, and further wherein the AC bus line is in electrical communication with an input terminal and the output terminal.

21. The method of claim 19, wherein the voltage sag is detected with a device controller.

22. The method of claim 19, wherein the voltage of the correction signal is reduced to approximately the line-to-neutral voltage.

23. The method of claim 19, wherein the voltage of the correction signal at a secondary winding of the injection transformer plus a reduced voltage of the first operating signal during the voltage sag is approximately equal to the line-to-neutral voltage of the first operating signal during a normal operating condition.

24. The method of claim 19, wherein a line-to-line voltage across the second operating signal and the third operating signal is greater than the line-to-neutral voltage of the first operating signal by a factor of approximately a square root of three.

25. The method of claim 19, wherein the storage unit comprises a first storage capacitor connected in series with a second storage capacitor at a storage node.

26. The method of claim 19, wherein the rectifying device comprises a first rectifying device connected in series with a second rectifying device at a rectifying node.

27. The method of claim 19, wherein the inverter switching device comprises a first inverter switching device and a second inverter switching device connected in series at an inverting node.

28. A dynamic voltage sag correction device comprising:
an input terminal;
an output terminal in electrical communication with the input terminal and capable of providing a first operating signal to a load, wherein the first operating signal has a line-to-neutral voltage;
an input boost transformer adapted to increase a line-to-line voltage obtained across a second operating signal having the line-to-neutral voltage and a third operating signal having the line-to-neutral voltage such that an increased line-to-line input signal is provided to a regulator module, wherein a primary winding of the input boost transformer is connected across a first AC bus line and a second AC bus line, and a secondary winding of the input boost transformer is connected across the second AC bus line and the regulator module;
the regulator module connected between the input terminal and the output terminal and comprising
a rectifying device adapted to rectify the increased line-to-line input signal;
a storage unit adapted to store energy corresponding to the rectified increased line-to-line input signal; and
an inverter switching device adapted to use the stored energy to generate a correction signal during at least a portion of a voltage sag;
an injection transformer in electrical communication with the regulator module and adapted to reduce a voltage of the correction signal, wherein a secondary winding of the injection transformer is connected in series between the input terminal and the output terminal; and
a bypass switch in electrical communication with the input terminal and the output terminal, wherein the bypass switch is in a closed position during a normal operating condition such that the injection transformer is bypassed, and further wherein the bypass switch is in an open position during at least a portion of the voltage sag such that the injection transformer is energized.

29. The device of claim 28, wherein the input boost transformer comprises an auto transformer.

30. The device of claim 29, wherein the auto transformer is adapted to increase the line-to-line voltage by approximately 69 Volts during the normal operating condition.

31. The device of claim 28, wherein the injection transformer reduces the voltage of the correction signal to approximately the line-to-neutral voltage.

32. The device of claim 28, wherein the increased line-to-line voltage is approximately equal to a voltage rating of the regulator module.

33. The device of claim 28, wherein a sum of the reduced voltage of the correction signal at the secondary winding and a reduced line-to-neutral voltage of the first operating signal during the voltage sag are approximately equal to the line-to-neutral voltage of the first operating signal during the normal operating condition.

34. The device of claim 28, wherein the storage unit comprises a first storage capacitor connected in series with a second storage capacitor at a storage node, the rectifying device comprises a first rectifying device connected in series with a second rectifying device at a rectifying node, and the inverter switching device comprises a first inverter switching device and a second inverter switching device connected in series at an inverting node, and further wherein the storage node, the rectifying node, and the inverting node are connected in parallel by a first bus line and a second bus line.

35. A method of correcting a voltage sag condition comprising:
connecting a load to an output terminal such that the load receives a line-to-neutral voltage of a first operating signal;
using an input boost transformer to increase a line-to-line voltage obtained across a second operating signal having the line-to-neutral voltage and a third operating signal having the line-to-neutral voltage such that an increased line-to-line input signal is provided to a regulator module, wherein the increased line-to-line voltage is approximately equal to a voltage rating of a regulator module, and wherein a primary winding of the input boost transformer is connected across a second AC bus line and a third AC bus line, and a secondary winding of the input boost transformer is connected across the third AC bus line and a rectifying node;

rectifying the increased line-to-line input signal;

storing energy corresponding to the rectified increased line-to-line input signal in a storage unit;

detecting a voltage sag along a first AC bus line in electrical communication with the output terminal;

using an inverter switching device to generate a correction signal with the stored energy;

opening a static bypass switch such that an injection transformer is not bypassed;

using the injection transformer to reduce a voltage of the correction signal; and providing the correction signal from the injection transformer to the load.

36. A dynamic voltage sag correction device comprising:
an input terminal;
an output terminal in electrical communication with the input terminal and adapted to provide a first operating signal to a load, wherein the first operating signal has a line-to-neutral voltage;
a step-down transformer adapted to decrease a line-to-line voltage obtained across a second operating signal having the line-to-neutral voltage and a third operating signal having the line-to-neutral voltage such that a decreased line-to-line input signal is provided to a regulator module;
the regulator module connected between the input terminal and the output terminal and comprising
  a rectifying device adapted to rectify the decreased line-to-line input signal;
  a storage unit adapted to store energy corresponding to the rectified decreased line-to-line voltage; and
  an inverter switching device adapted to use the stored energy to generate a correction signal during at least a portion of a voltage sag;
an output boost transformer in electrical communication with the regulator module and adapted to increase a voltage of the correction signal, wherein a primary winding of the output boost transformer is connected across the regulator module and a secondary winding of the output boost transformer is connected in series with the regulator module; and
a bypass switch in electrical communication with the input terminal and the output terminal, wherein the bypass switch is in a closed position during a normal operating condition such that the step-down transformer and the output boost transformer are bypassed.

37. The device of claim 36, wherein the output boost transformer comprises an auto transformer.

38. The device of claim 37, wherein the auto transformer is adapted to increase the voltage of the correction signal by approximately 69 Volts during the normal operating condition.

39. The device of claim 36, wherein the line-to-neutral voltage comprises approximately 346 Volts.

40. The device of claim 36, wherein the decreased line-to-line voltage is approximately equal to a voltage rating of the regulator module.

41. The device of claim 36, wherein a sum of the increased voltage of the correction signal and a reduced voltage of the first operating signal during the voltage sag is approximately equal to the line-to-neutral voltage of the first operating signal during the normal operating condition.

42. The device of claim 36, wherein a primary winding of the step-down transformer is connected across a second AC bus line and a third AC bus line, and a secondary winding of the step-down transformer is connected across a first AC bus line and the regulator module.

43. The device of claim 42, wherein the secondary winding of the step-down transformer is connected across the first AC bus line and a rectifying node of the regulator module.

44. A method of correcting a voltage sag condition comprising:
connecting a load to an output terminal adapted to provide the load with a first operating signal which has a line-to-neutral voltage;
using a step-down transformer to decrease a line-to-line voltage obtained across a second operating signal having the line-to-neutral voltage and a third operating signal having the line-to-neutral voltage such that a decreased line-to-line input signal is provided to a regulator module;
rectifying the decreased line-to-line input signal;
storing energy corresponding to the rectified decreased line-to-line input signal in a storage unit;
detecting a voltage sag;
using an inverter switching device to generate a correction signal with the stored energy in response to the detected voltage sag;
opening a static bypass switch such that an output boost transformer is energized, wherein a primary winding of the output boost transformer is connected across the regulator module and a secondary winding of the output boost transformer is connected in series with the regulator module; and
using the output boost transformer to increase a voltage of the correction signal.

45. The method of claim 44, wherein the decreased line-to-line voltage is approximately equal to a voltage rating of a regulator module.

46. The method of claim 44, further comprising providing the correction signal with the increased voltage to the load.

47. A dynamic voltage sag correction device comprising:
an input terminal;
an output terminal in electrical communication with the input terminal and adapted to provide a first operating signal to a load, wherein the first operating signal has a line-to-neutral voltage;
a transformer adapted to increase or reduce a line-to-line voltage obtained across a second operating signal having the line-to-neutral voltage and a third operating signal having the line-to-neutral voltage such that an increased or decreased line-to-line input signal is provided to a regulator module, wherein a primary winding of the transformer is connected across a second AC bus line and a third AC bus line, and a secondary winding of the transformer is connected across a first AC bus line and the regulator module;
the regulator module connected between the input terminal and the output terminal and comprising
  a rectifying device adapted to rectify the increased line-to-line input signal;
  a storage unit adapted to store energy corresponding to the rectified increased line-to-line voltage; and
  an inverter switching device adapted to use the stored energy to generate a correction signal during at least a portion of a voltage sag;
an output buck transformer in electrical communication with the regulator module and adapted to decrease a voltage of the correction signal; and
a bypass switch in electrical communication with the input terminal and the output terminal, wherein the bypass switch is in a closed position during a normal operating condition such that the transformer and the output buck transformer are bypassed.

48. The device of claim 47, wherein the output buck transformer comprises an auto transformer.

49. The device of claim 47, wherein the line-to-neutral voltage comprises approximately 240 Volts.

50. The device of claim 47, wherein a primary winding of the output buck transformer is connected across the regulator module and a secondary winding of the output buck transformer is connected in series with the regulator module.

* * * * *